(12) United States Patent
Raymond et al.

(10) Patent No.: US 6,916,505 B2
(45) Date of Patent: Jul. 12, 2005

(54) MANNICH BASED ADDUCTS AS WATER BASED EPOXY CURING AGENTS WITH FAST CURE CAPABILITIES FOR GREEN CONCRETE APPLICATION

(75) Inventors: William R. Raymond, New Tripoli, PA (US); Michael Cook, De Meern (NL)

(73) Assignee: Air Products and Chemicals, Inc., Allentown, PA (US)

( * ) Notice: Subject to any disclaimer, the term of this patent is extended or adjusted under 35 U.S.C. 154(b) by 239 days.

(21) Appl. No.: 10/378,965

(22) Filed: Mar. 4, 2003

(65) Prior Publication Data

US 2004/0176502 A1 Sep. 9, 2004

(51) Int. Cl.[7] .................. B05D 1/36; C08L 63/00; C08G 14/00; C08G 14/06
(52) U.S. Cl. .............. 427/403; 528/107; 528/129; 528/162; 528/163; 528/164; 528/230; 528/266; 528/421; 528/422
(58) Field of Search .................. 528/86, 87, 106, 528/107, 129, 162, 163, 164, 230, 266, 403, 421, 422; 427/403

(56) References Cited

U.S. PATENT DOCUMENTS

| | | |
|---|---|---|
| 3,734,965 A | 5/1973 | Becker |
| 4,269,742 A | 5/1981 | Goeke et al. .................. 260/18 |
| 4,714,750 A | 12/1987 | Grigsby, Jr. et al. .......... 528/99 |
| 4,736,011 A | 4/1988 | Waddill et al. .............. 528/111 |
| 5,098,986 A | 3/1992 | Speranza et al. ............ 528/149 |
| 5,120,817 A | 6/1992 | Speranza et al. ............. 528/99 |
| 6,077,884 A | 6/2000 | Hess et al. |

FOREIGN PATENT DOCUMENTS

| | | | |
|---|---|---|---|
| EP | 0000605 | | 4/1983 |
| EP | 0 684 268 A1 | | 5/1994 |
| JP | 10101774 | | 4/1998 |
| WO | WO 98/15588 | * | 4/1998 ........... C08G/59/62 |

OTHER PUBLICATIONS

European Search Report No. 04004402.6–2102 dated May 26, 2004.
M. Tramontini, "Advances in the Chemistry of Mannich Bases,"Methods in Synthetic Organic Chemistry–Synthesis, Academic Press, pp. 703–775 (1973).
M. Tramontini, et al., "Mannich Bases in Polymer Chemistry," Polymer, vol. 29, p. 771–788 (1988).
F. F. Blicke, "The Mannich Reaction," Org. Reactions 10, pp. 303–341 (1942).

* cited by examiner

*Primary Examiner*—Michael J. Feely
(74) *Attorney, Agent, or Firm*—Michael Leach

(57) ABSTRACT

A water-soluble composition including a water soluble polyamine adduct which is a reaction product of: (a) an alkoxy group modified polyepoxide resin containing an average of at least 1.5 epoxide groups per molecule; and (b) a Mannich base polyamine. The Mannich base polyamine is a reaction product of a polyamine containing at least two amino groups with a N-Mannich condensate prepared from a reaction of a phenolic compound, an aldehyde, and a secondary amine wherein the secondary amine of the N-Mannich condensate is replaced by one of the at least two amino groups of the polyamine, and wherein the ratio of the Mannich base polyamine to the alkoxy group modified polyepoxide resin contains an excess of an active amine hydrogen relative to epoxide groups so that the water soluble polyamine adduct has an amine hydrogen equivalent weight of at most 1000 based on solids content.

48 Claims, No Drawings

MANNICH BASED ADDUCTS AS WATER BASED EPOXY CURING AGENTS WITH FAST CURE CAPABILITIES FOR GREEN CONCRETE APPLICATION

BACKGROUND OF THE INVENTION

This invention relates to water-soluble polyamine adducts, compositions thereof with epoxy resins and methods for making the same, and more particularly to water-soluble curing agents in the form of an aqueous solution of polyamine adducts with epoxy resins.

Most organic solvents are ecologically unfriendly and damaging for the environment. Attempts were made to at least partially replace the organic solvents by water. Most water-based curing agents for epoxy resins have drawbacks such as relatively long hardening time, poor stability on green concrete, and a breakdown of a curing agente/poxy resins emulsion after it is added to a concrete. In addition, the known curing agents can only be applied in thin films. Furthermore, the chemical resistance of these curing agents is not as good as that of solvent-based or solvent-free epoxy systems.

It is known to use exchange chemistry for production of amino functional phenols, which are generally referred to as Mannich bases. The preparation of Mannich bases is further described in "Advances in Chemistry of Mannich bases" by M. Tramontini, Methods in Synthetic Organic Chemistry-Synthesis, Academic Press, pp. 703–775, 1973; "Mannich Bases in Polymer Chemistry" by M. Tramontini et al., Polymer, 1988, vol. 29, May, pp. 771–788; and "The Mannich Reaction" by F. F. Blick, Org. Reactions 10, 303 (1942).

It is known to use Mannich bases as curing agents for epoxy resins, e.g., as disclosed in U.S. Pat. No. 4,269,742 to Goeke et al. This patent describes making Mannich bases by a trans-aminification reaction or exchange chemistry, wherein a higher boiling amine such as amidoamine or polyamidoamine displaces a lower boiling amine. This patent does not describe subsequent adduction or modification of curing agents for waterborne formulations.

U.S. Pat. No. 4,736,011 to Waddill et al. describes Mannich condensates, which are prepared by the reaction of an imidazole with formaldehyde and a polyoxyalkylene polyamine.

U.S. Pat. No. 3,734,965 to Becker describes the preparation of phenolic resins by condensation of a polyoxypropylene polyamine with a phenol and an aldehyde.

U.S. Pat. No. 4,714,750 to Grigsby et al. describes Mannich condensation of 2,6-di-t-butyl-phenol with formaldehyde and polyoxyalkylene amine. Similarly, U.S. Pat. No. 5,098,986 to Speranza et al. describes a two-stage reaction, where during the first stage an alkylphenol undergoes a reaction with formaldehyde and a first polyoxyalkylene diamine to form a condensate. During the second stage, the resulting condensate is further reacted with formaldehyde and a second polyoxyalkylene diamine.

More recently, other patents disclosed the use of some Mannich base condensates as emulsions in waterborne epoxy applications. U.S. Pat. No. 5,120,817 to Speranza et al. describes an epoxy resin composition containing a Mannich condensate as a curing agent, wherein the Mannich condensate is a polyoxyethylenediamine formed by condensation of phenol, formaldehyde and a polyoxyethylenediamine. The polyoxyethylenediamine has the following formula:

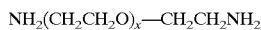

wherein x ranges from 1 to 3. When phenol, formaldehyde and polyoxyethylenediamine were reacted in a ratio of 1:3:3, the resulting reaction mixture gelled and was therefore unusable as the curing agent (See column 6, lines 50–53).

Japanese Patent 10101774 describes a composition containing a polyepoxide and a Mannich base polyamine prepared by reacting a phenolic compound with a carbonyl compound and a polyamine. The resulting Mannich base polyamine is further reacted with a diepoxide having an aromatic or alicyclic structure in the molecule and two glycidyl groups, e.g., a diglycidyl ether of polyoxyethylene glycol.

In addition, water-based solutions of polyamine adducts tend to become cloudy as can be observed by a human eye upon dilution with water, and thereby, they are not capable of maintaining a single phase uniformity required for further application of the solution.

In making concrete structures such as floors, it is known to apply to a wet concrete substrate a substance that is designed to retard the evaporation of water from the concrete substrate. Such substances are referred to in the industry as curing compounds. In prior art, curing compound (wax) is sprayed on concrete to slow down evaporation of water. After the concrete substrate has cured, it is necessary to remove the curing compound from the concrete substrate prior to applying primer or another coating. Therefore, curing concrete results in a sequence of multiple steps that is costly and time consuming. p Further, it is known in the prior art that when coatings are made with epoxy curing agents and applied to green concrete, such coatings suffer from poor adhesion to the concrete. It is also found that application of water-born epoxy curing agents often results in breaking of the emulsion. Often it is necessary for concrete to be cured for a period of up to one month before a coating can be applied to have adequate adhesion.

There is a need to provide a curing compound, which can also serve as a primer and does not have to be removed.

Further, there is a need to provide epoxy curing agents with good adhesive properties that can be formulated with epoxy resins to provide coatings for less than fully cured concrete, i.e., green concrete.

It is further desired to provide a water-soluble curing agent for epoxy applications, which maintain a single phase when diluted with water to low concentrations. It is desired to overcome the above drawbacks and to find products with improved properties. It is further desired to provide an amine-based epoxy resin curing composition, which is soluble in water and can easily emulsify liquid epoxy resins. It is still further desired to improve the stability of systems comprising concrete for a variety of applications such as a polymer modified concrete, a primer on green concrete, and a concrete curing compound.

All references cited herein are incorporated herein by reference in their entireties.

BRIEF SUMMARY OF THE INVENTION

This invention is directed to a water-soluble composition comprising a water soluble polyamine adduct which is a reaction product of:

(a) an alkoxy group modified polyepoxide resin containing an average of at least 1.5 epoxide groups per molecule; and (b) a Mannich base polyamine, wherein the Mannich base polyamine is a reaction product of a polyamine containing at least two amino groups with a N-Mannich condensate prepared from a reaction of a phenolic compound, an aldehyde, and a secondary amine; and provided that the secondary amine of the N-Mannich condensate is replaced by one of the at least two amino groups of the polyamine, the polyamine boils at a higher temperature than the secondary amine, and at least one of the at least two amino groups of the polyamine is a primary or a secondary amino group; and wherein the ratio of the Mannich base polyamine to the alkoxy group modified polyepoxide resin contains an excess of an active amine hydrogen relative to epoxide groups so that the water soluble polyamine adduct has an amine hydrogen equivalent weight (AHEW) of at most 1000 based on solids content.

Another aspect of this invention is directed to a composition comprising a product of reaction of a water-soluble composition and a polyepoxide resin containing an average of at least 1.5 epoxide groups per molecule, wherein the composition is capable of hardening.

Yet, another aspect of this invention is directed to a process for preparing a water-soluble composition comprising:

(a) producing a N-Mannich condensate by reacting a phenolic compound, an aldehyde, and a secondary amine;

(b) producing a Mannich base polyamine, wherein the Mannich base polyamine is a reaction product of a polyamine containing at least two amino groups with a N-Mannich condensate prepared from a reaction of a phenolic compound, an aldehyde, and a secondary amine; and provided that the secondary amine of the N-Mannich condensate is replaced by one of the at least two amino groups of the polyamine, the polyamine boils at a higher temperature than the secondary amine, and at least one of the at least two amino groups of the polyamine is a primary or a secondary amino group; and (c) reacting the Mannich base polyamine with an alkoxy group modified polyepoxide resin containing an average of at least 1.5 epoxide groups per molecule, wherein the ratio of the Mannich base polyamine to the alkoxy group modified polyepoxide resin contains an excess of an active amine hydrogen relative to epoxide groups so that the water soluble polyamine adduct has an amine hydrogen equivalent weight (AHEW) of at most 1000 based on solids content.

Further, this invention is directed to a primer for concrete comprising a product of reaction of a polyepoxide resin containing an average of at least 1.5 epoxide groups per molecule and a water-soluble composition.

In addition, this invention is directed to a process of treating concrete, comprising: providing the concrete, wherein the concrete has set; and applying to the concrete a primer to provide a primed concrete.

DETAILED DESCRIPTION OF THE INVENTION

The invention herein disclosed was driven by the desire to develop a stable water-based composition for curing epoxy resins. The invention flows from the surprising discovery that a water-soluble composition comprising a water soluble polyamine adduct forms a solution with water and not an emulsion or dispersion, provided that (1) the water soluble polyamine adduct is formed by reacting: (a) an alkoxy group modified polyepoxide resin containing an average of at least 1.5 epoxide groups per molecule and (b) a Mannich base polyamine and (2) the ratio of the Mannich base polyamine to the alkoxy group modified polyepoxide resin contains an excess of an active amine hydrogen relative to epoxide groups so that the water soluble polyamine adduct has an amine hydrogen equivalent weight (AHEW) of at most 1000 based on solids content.

It was discovered that the water-soluble polyamine adduct of the present invention can be diluted with water to at least 20 wt % and preferably to at least 10 wt % to form a single phase at a temperature of 20° C., provided that water is essentially free of an organic co-solvent. This discovery alleviates the problem of prior art water-based solutions of polyamine adducts wherein the water-based solutions of polyamine adducts would become cloudy as could be observed by a human eye upon dilution with water. Thus, the water-based solutions of polyamine adducts of the present invention are capable of maintaining a single phase uniformity required for further application or a storage of the solution.

Also, the present invention provides a composition having an excellent stability on green concrete (which as used herein means concrete that has set after about 8 hours or longer), the composition comprising a product of reaction of a water-soluble composition (a curing agent) and a polyepoxide resin containing an average of at least 1.5 epoxide groups per molecule, wherein the composition is capable of hardening. When applied as a primer, the composition rapidly develops a strong adhesive bond to the concrete.

Surprisingly, the inventor has discovered that the composition of the present invention can also act as a curing compound. When applied on the concrete, the composition forms a closed film on top of the concrete, which acts as a vapor barrier to partially or completely prevent water from evaporating from the concrete, and thus enabling the concrete to hydrate properly and increase its internal strength.

Furthermore, this curing compound remains on a surface as a primer and does not have to be removed as was required with curing compounds of prior art.

Preferably, the water-soluble composition of the present invention and the composition of the present invention have a 0% VOC, which enhances their application in a closed environment wherein using solvents can present a fire hazard or be harmful to a user.

In the present invention, the Mannich base polyamine is prepared by reacting a polyamine with a N-Mannich condensate. The polyamine of the present invention contains at least two amino groups wherein one amino group is a primary amino group and another amino group is a primary or a secondary amino group. The N-Mannich condensate of the present invention is prepared from a reaction of a phenolic compound, an aldehyde, and a low boiling secondary amine. An exchange reaction (a trans reaction) takes place. During the reaction, the most volatile, the low boiling secondary amine is replaced by one of the at least two amino groups of the polyamine to form the Mannich base polyamine. The exchange chemistry of preparing the Mannich base polyamine used herein is described in U.S. Pat. No. 4,269,742 to Goeke et al.

N-Mannich condensates (or bases) have the following general formula (I):

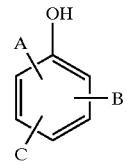

where A, B, and C are independently a hydrogen, an alkyl radical of up to 24 carbons with or without unsaturation, $CH_2N(R)_2$, wherein R is an alkyl chain with up to 8 carbons, provided that at least one of A, B, or C is $CH_2N(R)_2$.

In the water-soluble composition of the present invention, the N-Mannich condensate is preferably 2,4,6-tris-(dimethylaminomethyl)phenol.

The low boiling secondary amine is preferably dimethylamine, diethylamine, dipropylamine, or dibutylamine. The polyamine preferably contains alkoxylate groups.

In certain embodiments of the present invention, the polyamine used in the exchange chemistry reaction includes polyamines consisting of: an aliphatic polyamine such as ethylenediamine (EDA), diethylenetriamine (DETA), triethylenetetramine (TETA), hexamethylenediamine (HMDA), N-(2-aminoethyl)-1,3-propanediamine ($N_3$-Amine), N,N'-1,2-ethanediylbis-1,3-propanediamine ($N_4$-amine), or dipropylenetriamine; an arylaliphatic polyamine such as m-xylylenediamine (mXDA), or p-xylylenediamine; a cycloaliphatic polyamine such as 1,3-bisaminocyclohexylamine (1,3-BAC), isophorone diamine (IPDA), or 4,4'-methylenebiscyclohexanamine; an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis(3-aminopropyl) 2,4,8,10-tetraoxaspiro (5,5)undecane; a polyalkoxypolyamine where the alkoxy group can be an oxyethylene, oxypropylene, oxy-1,2-butylene, oxy-1,4-butylene or co-polymers thereof such as 4,7-dioxadecane-1,10-diamine, 1-propanamine,2,1-ethanediyloxy))bis(diaminopropylated diethylene glycol ANCAMINE 1922A), poly(oxy(methyl-1,2-ethanediyl)), alpha-(2-aminomethylethyl)omega-(2-aminomethylethoxy) (JEFFAMINE D 230, D-400), triethyleneglycoldiamine and oligomers (JEFFAMINE XTJ-504, JEFFAMINE XTJ-512), poly(oxy(methyl-1,2-ethanediyl)),alpha,alpha'-(oxydi-2,1-ethanediyl)bis(omega-(aminomethylethoxy)) (JEFFAMINE XTJ-511), bis(3-aminopropyl) polytetrahydrofuran 350, bis(3-aminopropyl) polytetrahydrofuran 750, poly(oxy(methyl-1,2-ethanediyl)), a-hydro-w-(2-aminomethylethoxy) ether with 2-ethyl-2-(hydroxymethyl)-1,3-propanediol (3:1) (JEFFAMINE T-403), and diaminopropyl dipropylene glycol.

Preferred polyamines include polyamines consisting of diethylenetriamine (DETA), triethylenetetramine (TETA), 1,3-bisaminocyclohexylamine (1,3-BAC), isophorone diamine (IPDA), N-aminoethylpiperazine (NAEP), 4,7-dioxadecane-1,10-diamine, 1-propanamine,3,3'-(oxybis(2,1-ethanediyloxy))bis-(ANCAMINE 1922A), poly(oxy(methyl-1,2-ethanediyl)),alpha-(2-aminomethylethyl)omega-(2-aminomethylethoxy (JEFFAMINE D 230, D-400), triethylene glycol diamine (JEFFAMINE XTJ-504), and poly(oxy(methyl-1,2-ethanediyl))alpha,alpha'-(oxy(di-2,1-ethanediyl))bis(omega-(aminomethylethoxy)). (JEFFAMINE XTJ-511).

The polyalkoxypolyamines are the most preferred polyamines for green concrete applications.

The amine exchange reaction between the N-Mannich condensate and the polyamine is preferably conducted at temperatures between 110° C. and 200° C. The maximum temperature used depends on the polyamine used in the reaction, wherein some polyamines can start polymerizing at 150° C. during the exchange reaction, e.g., TETA, while other polyamines such as JEFFAMINE D-230 are stable at higher temperatures (190–200° C.). The reaction lasts from about 0.5 to about 6 hours.

The ratio of polyamine to N-Mannich condensate is calculated based on the number of available active sites for exchange. In certain embodiments of the present invention, 0.8 to 2 moles polyamine is used for each active site of N-Mannich condensate. A preferred ratio is 0.8 to 1.2 moles polyamine per each N-Mannich condensate active site. N-Mannich condensates having at least 2 active sites are preferred.

The water soluble polyamine adduct (the curing agent) of the present invention is formed by reacting a Mannich base polyamine with an alkoxy group modified polyepoxide resin containing an average of at least 1.5 epoxide groups per molecule. The alkoxy groups are preferably derived from polyoxyethylene, polyoxypropylene, poly-1,2-oxybutylene, or polytetrahydrofuran.

In certain embodiments of the present invention, the alkoxy group modified polyepoxide resin is selected from the following categories:

(i) a reaction product of a polyether polyol containing at least 2 OH groups and a polyalkoxy chain with a polyepoxide resin containing an average of at least 1.5 epoxide groups per molecule;

(ii) a reaction product of a polyepoxide resin containing an average of at least 1.5 epoxide groups per molecule with a polyalkoxy monoamine containing a polyalkoxy chain, wherein the polyalkoxy monoamine has the following structure:

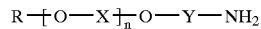

where R is H or $C_1$ to $C_{12}$ alkyl, X is a $C_2H_4$, $C_3H_6$, or $C_4H_8$ alkyl group, Y is a $C_2H_4$, $C_3H_6$, or $C_4H_8$ alkyl group, and n is a number of repeats sufficient to produce the polyalkoxy monoamine having a molecular weight of from about 200 to about 4000;

(iii) a polyglycidyl ether of a polyether polyol containing at least 2 OH groups and a polyalkoxy chain; and (iv) a diglycidyl ether derivative of an alkoxylated diphenol containing an average of at least 1.5 epoxide groups per molecule.

In certain embodiments of the present invention, the alkoxy group modified polyepoxide resin is (i) a reaction product of a polyether polyol containing at least 2 OH groups and a polyalkoxy chain with a polyepoxide resin containing an average of at least 1.5 epoxide groups per molecule as described in U.S. Pat. No. 4,197,389 to Becker et al., column 3, lines 23–27 and column 4, line 13 to column 6 line 20, non-limiting examples of which are presented below. In the present invention, one of the aspects of the role of the polyether polyols is to control the solubility of the polyamine adduct and to provide the surfactancy required to emulsify the epoxy resin used in the primer formulation.

Suitable polyepoxide resins containing an average of at least 1.5 epoxide groups per molecule used in (i) are epoxides of polyunsaturated hydrocarbons, such as vinylcyclohexene, dicyclopentadiene, cyclohexadiene, cyclododecadiene, cyclododecatriene, isoprene, 1,5-hexadiene, butadiene, polybutadienes, divinylbenzenes and the like; oligomers of epichlorohydrin and the like; epoxyethers of polyhydric alcohols, such as of ethylene, propylene and butylene glycols, polyglycols, thiodiglycols, glycerol, pentaerythritol, sorbitol, polyvinyl alcohol, polyallyl alcohol and the like; epoxyethers of polyhydric phenols, such as of resorcinol, hydroquinone, bis-(4-hydroxyphenyl)-methane bis-(4-hydroxy-3-methylphenyl)-methane, bis-(4-hydroxy-3,5-dibromophenyl)-methane, bis-(4-hydroxy-3,5-difluorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, 2,2-bis-(4-hydroxy-3,5- dichlorophenyl)-propane, bis-(4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)-cyclohexylmethane, 4,4'-dihydroxydiphenyl, 2,2'-dihydroxydiphenyl, 4,4'-dihydroxydiphenylsulphone and their hydroxyethylethers, phenol-formaldehyde condensation products such as phenol alcohols, phenol aldehyde resins and the like; S- and N-containing epoxides, such as N,N-diglycidylaniline and N,N'-dimethyldiglycidyl-4,4-diaminodiphenylmethane, and epoxides which have been prepared by conventional methods from polyunsaturated carboxylic acids or monounsaturated carboxylic acid esters of unsaturated alcohols, glycidyl esters, polyglycidyl esters (which may be obtained by polymerisation or copolymerisation of glycidyl esters of unsaturated acids or from other acid compounds, such as cyanuric acid, diglycidyl sulphide, cyclic trimethylene, trisulphone or derivatives thereof, and the like).

The polyepoxide resins may be reacted according to the process as described in U.S. Pat. No. 4,197,389 to Becker et al., individually or in admixture, optionally in the presence of solvents or softeners, or used for the preparation of compositions. They may also be employed in admixture with monoepoxides. Thus, for example, the following monoepoxides may be used in admixture with the above-mentioned polyepoxide compounds: epoxidised unsaturated hydrocarbons such as butylene, cyclohexene, styrene oxide and the like; halogen-containing epoxides such as epichlorohydrin; epoxyethers of monohydric alcohols such as methyl, ethyl, butyl, 2-ethylhexyl, dodecyl alcohol and the like; epoxyethers of monohydric phenols such as phenol, cresol and other phenols substituted in the o- or p-positions; glycidyl esters of unsaturated carboxylic acids; expoxidised esters of unsaturated alcohols or unsaturated carboxylic acids; and the acetals of glycidaldehyde.

Preferred polyhydric phenols which may be employed are: resorcinol and various bisphenols obtained by condensation of phenol with aldehydes and ketones such as for example formaldehyde, acetaldehyde, acetone, methylethyl ketone, etc. Resins of this type are described in U.S. Pat. Nos. 2,855,159 and 2,589,245.

A preferred polyepoxide resin for use in the invention is a polyphenol glycidyl ether, e.g., a reaction product of epichlorohydrin and 2,2-bis-(4-hydroxyphenyl)-propane (that is, bisphenol A) or the homologue thereof based on bisphenol F, individually or in admixture with bisphenol A. Preferably, the polyepoxide resins has an epoxy equivalent weight of 160–500.

In certain embodiments of the present invention, the polyether polyols containing at least two OH groups and a polyalkoxy chain are polyalkylene polyetherpolyols which are preferably soluble in water, and include, for example, an addition product of an alkylene oxide or an addition product of an alkylene oxide with a polyhydric alcohol. Suitable alkylene oxides are, for example, ethylene oxide, propylene oxide, butylene oxide, amylene oxide and hetero- or block copolymers of these oxides. Preferably, however, the alkylene oxide is ethylene oxide. Suitable polyhydric alochols are both aliphatic and aromatic alcohols individually or in admixture, such as, for example, ethylene glycol, 1,3-propylene glycol, 1,2-propylene glycol, 1,4-butylene glycol, 1,3-butylene glycol, 1,2-butylene glycol, 1,5-pentandiol, 1,4-pentandiol, 1,3-pentandiol, 1,6-hexandiol, 1,7-heptandiol, glycerol, 1,1,1-trimethylolpropane, 1,1,1-trimethylolethane, hexan-1,2,6-triol, alpha-methylglucoside, pentaerythritol, and sorbitol.

The polyalkylene polyetherpolyols may also be prepared from other starting materials, for example, from tetrahydrofuran and alkylene oxide-tetrahydrofuran copolymers; epihalogenohydrins, e.g. epichlorohydrin, as well as aralkylene oxides, e.g. styrene oxide.

The polyalkylene polyetherpolyols may have either primary or secondary hydroxyl groups, and are preferably polyethers prepared from alkylene oxides with 2 to 6 carbon atoms, e.g. polyethylene ether glycols, polypropylene ether glycols and polybutylene ether glycols. The polyalkylene polyetherpolyols may be prepared by known processes, e.g. by the process of Wurtz (1859) described in the Encyclopaedia of Chemical Technology, vol. 7, pp. 257–262, Interscience Publishers, Inc (1951) or in U.S. Pat. No. 1,922,459.

The average molecular weight of polyalkylene polyetherpolyols is generally from 200 to 10,000, and preferably from 800 to 1,200. Preferably, polyether polyols are reacted with polyepoxide resins in (i) at a molar ratio of from about ⅕ to about ⅒ and more preferably at the molar ratio of from ½ to ¼.

The alkoxy group modified polyepoxide resin of category (i), which is a reaction product of a polyether polyol containing at least 2 OH groups and a polyalkoxy chain with a polyepoxide resin containing an average of at least 1.5 epoxide groups per molecule is further referred to herein as Resin 1.

In certain embodiments of the present invention, the alkoxy group modified polyepoxide resin is selected from the category (ii), which is a reaction product of a polyepoxide resin containing an average of at least 1.5 epoxide groups per molecule with a polyalkoxy monoamine containing a polyalkoxy chain, wherein the polyalkoxy monoamine has the following general formula (II):

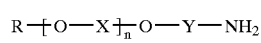

where R is H or $C_1$ to $C_{12}$ alkyl, X is a $C_2H_4$, $C_3H_6$, or $C_4H_8$ alkyl group, Y is a $C_2H_4$, $C_3H_6$, or $C_4H_8$ alkyl group, and n is a number of repeats sufficient to produce the polyalkoxy monoamine having a molecular weight of from about 200 to about 4000 and preferably from about 800 to about 1200. Preferably, the polyalkoxy chain of the polyalkoxy monoamine in (ii) is polyethylene oxide or polypropylene oxide.

Resin 1 and Resin 2 can be manufactured in solvents, which can be used as a co-solvent with water, or which can be the same as the one used in the solvent-containing (indirect adduction) process for the adduction as described below. At the end of the adduction process, the solvent can be removed to give a zero VOC curing agent.

In certain embodiments of the present invention, the alkoxy group modified polyepoxide resin is selected from the category (iii), which is a polyglycidylether of a polyether polyol containing at least 2 OH groups and a polyalkoxy chain. This polyepoxide resin is commercially available under the trade name of GRILONIT from Ems Chemie, Switzerland. These polyepoxide resins are further referred to herein as Resin 3 and have the general formula (III):

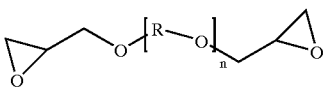

where R is a derivative of polyethylene oxide, polypropylene oxide, polybutylene oxide, and polytetrahydrofuran or copolymers thereof, and n is 2 to 100. Preferred glycidylethers are those containing polypropyleneoxide or polytetrahydrofuran chains having 6 to 14 units. Preferably, the polyglycidyl ether of the polyether polyol in (iii) has a molecular weight from about 200 to about 4000, and more preferably from 800 to 1200.

In certain embodiments of the present invention, the alkoxy group modified polyepoxide resin is selected from the category (iv), which is a diglycidyl ether derivative of an alkoxylated diphenol containing an average of at least 1.5 epoxide groups per molecule. Preferred alkoxy group modified polyepoxide resins are diglycidylethers resulting from the reaction of epichlorohydrin with alkoxylated bisphenols such as bisphenol-A or bisphenol-F with EO, PO, 1,2-BO, or tetrahydrofuran, or diglycidylethers of alkoxylated polyphenols.

The alkoxylated diphenol in (iv) has the following structure:

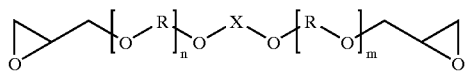

where X is an arylidene radical derived from a diphenol, R is a $C_2H_4$, $C_3H_6$ or $C_4H_8$ alkyl group, and n+m=1 to 20 and preferably n+m=4 to 10. In the preferred embodiment of the invention, diphenol is resorcinol, bisphenol-A, or bisphenol-F.

In certain embodiments of the present invention, alkoxy group modified polyepoxide resins have the general formula (IV) and are further referred to herein as Resin 4:

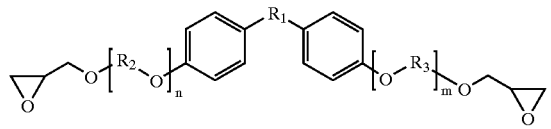

where $R_1$ is a methylene, 1-methylethylidene, sulfonyl, $R_2$ and/or $R_3$ is a repeat unit derived from EO, PO, 1,2-BO, tetrahydofurane, caprolactone and copolymers thereof; and n+m is 2 to 50.

Resins 1–4 described above are preferred alkoxy group modified polyepoxide resins of the present invention, and most preferred are Resins 1 and 2. Other polyglycidylethers containing alkoxylates species can be used also. The alkoxylate containing polyglycidyl ethers can also be mixed with polyepoxides not containing alkoxylate.

In certain embodiments of the present invention, polyglycidylethers (polyepoxides) of the present invention can be mixed with polyglycidylethers (polyepoxides) not containing polyoxyalkylene groups, such as bisphenol-A, bisphenol-F diglycidyl ether and other poly- or even monoglycidyl ethers, the list of which can be May and Y. Tanaka, "Epoxy Resins, Chemistry and Technology" (1988, Marcel Dekker, Inc.) pp. 9–105; W. G. Potter, "Epoxide Resins" (1970, Butterworth & Co Ltd); and A. M. Paquin, "Epoxyverbindungen und Epoxydharze" (1958, Springer-Verlag).

In the present invention, the alkoxy group modified polyepoxide resins react with exchanged amines of Mannich base polyamines to form water soluble polyamine adducts. Selection of the alkoxy group modified polyepoxide resin depends on the solubility of the Mannich base polyamine used. Very soluble amines require using propoxy, 1,2-butoxy or hydrofurane based polyglycidyl ethers, while the less soluble amine require polyethoxy based polyglycidyl ether. The length of the alkoxy chain depends on the exchange amine used. Alkoxy chains with 15 to 30 alkoxy units are preferred.

The alkoxy group modified polyepoxide resin of the present invention is reacted with a Mannich base polyamine in a ratio of 1 epoxy equivalent to 3–12 moles amine equivalent contained in the Mannich base polyamine depending on the reactivity of the exchange product. The preferred epoxy equivalent to amine equivalent ratio is 1 epoxy equivalent to 4–6 moles amine equivalent (i.e., 1:1–4).

The mole amine equivalent is determined as follows: during the reaction, the input of polyamine and the amount DMA released are controlled in order to determine the Amine Hydrogen Equivalent Weight (the AHEW) of the resulting product. The mole amine equivalent is obtained by multiplying the AHEW by the number of reacting H's left on the amine molecule after the exchange reaction has taken place. For example, when using JEFFAMINE D-230 in the exchange reaction, a product has the AHEW of 97. JEFFAMINE D-230 has four reactive sites, and after the exchange reaction, three sites are left. Therefore, the mole amine equivalent is 291.

In certain embodiments of the present invention, the ratio of the Mannich base polyamine to the alkoxy group modified polyepoxide resin contains Lan excess of an active amine hydrogen relative to epoxide groups so that the water soluble polyamine adduct has an amine hydrogen equivalent weight (AHEW) of at most 1000 based on solids content. Preferably, the AHEW is at most 350 based on solids content, and more preferably, the AHEW is at most 200 based on solids content.

In certain embodiments of the present invention, the water-soluble polyamine adduct is obtained by direct adduction, wherein the Mannich base polyamine is mixed with a resin without addition of a solvent.

In certain embodiments of the present invention, the water-soluble polyamine adduct is obtained by using an additional step of adding a solvent, which can be removed azeotropically with water in circumstances when the direct adduction, which is a reaction of a Mannich base polyamine with a polyepoxide, is not recommended. The resulting adduct can become very thick and will tend to gel. Various suitable processes can be used to alleviate that problem. The preferred process includes using a solvent, which can be removed azeotropically with water. Preferred solvents are n-butanol, toluene, or xylene. At the end of the reaction, some of the solvent is removed either at normal pressure or under lower pressure. When the reactor's content becomes thicker, water is added slowly, and is used to flush the remaining solvent, and to replace it, thereby keeping the viscosity of the product low.

When all the solvent has been removed completely, or when the adduction has been completed (as in the direct process) the product has to be cooled down to temperatures between 20–70° C., preferably 40–50° C., before the water is added. This is to ensure that the product will not gel. The reaction is not completely understood but the inventor discovered that if the water was added at an excessively high temperature, for example 80° C., the product sometimes gelled. This rendered it useless as a curing agent. The water is preferably distilled or deionized. Water is added to adjust the % solids to the required amount, usually between 50 and 80% depending on product and requirements.

The water-soluble polyamine adduct of the present invention can be further modified with some monoepoxide, preferably phenylglycidylether, o-cresylglycidylethers, p-tert-butylphenylglycidylethers, n-butylglycidylethers or any other glycidylethers or esters, which can react with an amine group. This last adduction can be used to improve the miscibility with the epoxy resin.

The water-soluble polyamine adduct of the present invention can also be modified with acids. Non-limiting examples of acids are organic acids such as acetic acid, sulfamic acid, lactic acid, salicylic acid, sebacic acid and inorganic acids such as boric acid and phosphoric acid. The acids protonate some of the amine and thereby increase the solubility of the product in water.

The water-soluble polyamine adduct of the present invention can also be mixed with other exchange product(s) to adjust certain properties such as drying speed, hardness development, clarity of the film, gloss, etc. or it can be mixed with other existing water based curing agents to accelerate or modify the cure.

The water-soluble polyamine adduct of the present invention can be diluted in water to form a polyamine adduct solution. In certain embodiments of the present invention, the water-soluble composition consists essentially of the water-soluble polyamine adduct.

One of the advantages of the present invention is that the composition of the present invention can cure rapidly and can be applied on fresh concrete. Applications of compositions of the present invention include, but are not limited to its use as a primer, a coating, a curing compound, and/or a sealant for a concrete. The term "primer" as used herein means an agent used for application on surfaces prior to application of a coating to improve adhesive bonding. The term "coating" as used herein means an agent used for application on a surface to create a protective or decorative layer or a coat. The term "curing compound" and "sealant" are used herein as defined in ASTM C-309-97.

As used herein, the curing compound is capable of forming a protective film on top of a concrete, acting as a vapor barrier to partially or completely prevent water from evaporating from the concrete, and thus enabling the concrete to hydrate properly and increase its internal strength. The sealant is capable of forming a protective film on top of a concrete, acting as a barrier to partially or completely prevent liquids from getting in and moisture evaporating from the concrete.

The present invention also relates to the aqueous emulsions/dispersions containing hardeners prepared according to the method of the present invention. These reactive hardeners are suitable in combination with epoxy resins and additives for the production of coatings, intermediate coatings, primers, paints, molding compositions, sealants, adhesives, and curable pastes for various applications. The epoxy resin compositions of this invention readily emulsify the resin in water to form a fine emulsion. They can also form dispersion systems with dispersed epoxy resins. Suitable epoxy resins (polyepoxies) for forming dispersion systems with water-soluble polyamine adduct of the present invention are epoxides of polyunsaturated hydrocarbons, such as vinylcyclohexene, dicyclopentadiene, cyclohexadiene, cyclododecadiene, cyclododecatriene, isoprene, 1,5-hexadiene, butadiene, polybutadienes, divinyl-benzenes and the like; oligomers of epichlorohydrin and the like; epoxyethers of polyhydric alcohols, such as of ethylene, propylene and butylene glycols, polyglycols, thiodiglycols, glycerol, pentaerythritol, sorbitol, polyvinyl alcohol, polyallyl alcohol and the like; epoxyethers of polyhydric phenols, such as of resorcinol, hydroquinone, bis-(4-hydroxyphenyl)-methane bis-(4-hydroxy-3-methylphenyl)-methane,bis-(4-hydroxy-3,5-dibromophenyl)-methane, -bis-(4-hydroxy3,5difluorophenyl)-methane, 1,1-bis (4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, 2,2-bis-(4-hydroxy-3,5-dichlorophenyl)-propane, bis-(4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4hydroxyphenyl)-cyclohexylmethane, 4,4'-dihydroxydiphenyl, 2,2'-dihydroxydiphenyl, 4,4'-dihydroxydiphenylsulphone and their hydroxyethylethers, phenol-formaldehyde condensation products such as phenol alcohols, phenol aldehyde resins and the like; S- and N-containing epoxides, such as N,N-diglycidylaniline and N,N'-dimethyldiglycidyl-4,4-diaminodiphenylmethane, and epoxides which have been prepared by conventional methods from polyunsaturated carboxylic acids or monounsaturated carboxylic acid esters of unsaturated alcohols, glycidyl esters, polyglycidyl esters (which may be obtained by polymerisation or copolymerisation of glycidyl esters of unsaturated acids or from other acid compounds, such as cyanuric acid, diglycidyl sulphide, cyclic trimethylene, trisulphone or derivatives thereof, and the like).

Preferred polyhydric phenols which may be employed are: resorcinol and various bisphenois obtained by condensation of phenol with aldehydes and ketones such as for example formaldehyde, acetaldehyde, acetone, methylethyl ketone, etc. Resins of this type are described in U.S. Pat. Nos. 2,855,159 and 2,589,245.

A preferred polyepoxide resin for use in the composition of the present invention is a polyphenol glycidyl ether, e.g., a reaction product of epichlorohydrin and 2,2-bis-(4-hydroxyphenyl)-propane (bisphenol A) or the homologue thereof based on bisphenol F, individually or in admixture with bisphenol A. The epoxy resin has an epoxy equivalent weight of 160–500.

The polyepoxide resin for use in the composition of the present invention may be advantageously used together with other polyepoxide resins (which are listed above as non-limiting examples) that are not adducted with Mannich base polyamines as additives for hydraulic binders such as cement to manufacture polymer modified cements.

The composition of the present invention may be used with other polyepoxide resins (epoxies that are not adducted with Mannich base polyamines) to make clear coatings, paints, and/or primers directly, or they can be formulated by addition of pigments, fillers, additives (such as antifoam, defoamer, and a leveling agent), and/or co-solvent(s), as well as any other agents known to those skilled in the art. These formulations can be further diluted with water to adjust their viscosity and facilitate their application.

Surprisingly, the inventor discovered that the equipment used for the application of the system could be cleaned very readily in water without leaving a sticky greasy residue and without the need for detergents (or any surfactants) as is usually the case with other hardeners.

Also, the present invention provides a process for preparing a water-soluble composition comprising: (a) producing a N-Mannich condensate by reacting a phenolic compound, an aldehyde, and a secondary amine; (b) producing a Mannich base polyamine, wherein the Mannich base polyamine is a reaction product of a polyamine containing at least two amino groups with a N-Mannich condensate prepared from a reaction of a phenolic compound, an aldehyde, and a secondary amine; and provided that the secondary amine of the N-Mannich condensate is replaced by one of the at least two amino groups of the polyamine, the polyamine boils at a higher temperature than the secondary amine, and at least one of the at least two amino groups of the polyamine is a primary or a secondary amino group; and (c) reacting the Mannich base polyamine with an alkoxy group modified polyepoxide resin containing an average of at least 1.5 epoxide groups per molecule, wherein the ratio of the Mannich base polyamine to the alkoxy group modified polyepoxide resin contains an excess of an active amine hydrogen relative to epoxide groups so that the water soluble polyamine a hydrogen equivalent weight (AHEW) of at most 1000 based on solids content. In the process of the present invention, the water-soluble composition can be further diluted with water.

In certain embodiments of the present invention, the process for preparing a water-soluble composition further comprises diluting the Mannich base polyamine with an organic solvent to form an azeotropic mixture with water, azeotropically removing the organic solvent, and adding water in an amount sufficient to adjust a polyamine adduct solution to from about 10 to about 90 wt % solids, and preferably to 50–80 wt % solids.

Also, the present invention provides a primer for concrete comprising a product of reaction of a polyepoxide resin containing an average of at least 1.5 epoxide groups per molecule and a water-soluble composition prepared as described above, wherein the primer is adapted to be applied on concrete that has set. In certain embodiments of the present invention, the polyepoxide resin is selected from the group consisting of:

(i) a reaction product of a polyether polyol containing at least 2 OH groups and a polyalkoxy chain with a polyepoxide resin containing an average of at least 1.5 epoxide groups per molecule;

(ii) a reaction product of a polyepoxide resin containing an average of at least 1.5 epoxide groups per molecule with a polyalkoxy monoamine containing a polyalkoxy chain, wherein the polyalkoxy monoamine has the following structure:

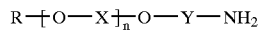

where R is H or $C_1$ to $C_{12}$ alkyl, X is a $C_2H_4$, $C_3H_6$, or $C_4H_8$ alkyl group, Y is a $C_2H_4$, $C_3H_6$, or $C_4H_8$ alkyl group, and n is a number of repeats sufficient to produce the polyalkoxy monoamine having a molecular weight of from about 200 to about 4000;

(iii) a polyglycidyl ether of a polyether polyol containing at least 2 OH groups and a polyalkoxy chain; and (iv) a diglycidyl ether derivative of an alkoxylated diphenol containing an average of at least 1.5 epoxide groups per molecule.

The preferred polyepoxide resin is selected from the group consisting of (i) and (ii).

In addition, the present invention provides a process of treating concrete, comprising curing the concrete using a curing compound to provide a cured concrete wherein the concrete has set and/or priming the concrete using a primer to provide a primed concrete, wherein at least one of the curing compound or the primer comprises the composition including a product of reaction of a water-soluble composition of the present invention and a polyepoxide resin containing an average of at least 1.5 epoxide groups per molecule, wherein the composition is capable of hardening. In a preferred embodiment, the curing compound remains attached to the cured concrete and functions as both the curing compound and the primer provided that both the curing compound and the primer comprise the composition, which includes a product of reaction of a water-soluble composition of the present invention and a polyepoxide resin containing an average of at least 1.5 epoxide groups per molecule.

The invention will be illustrated in more detail with reference to the following Examples, but it should be understood that the present invention is not deemed to be limited thereto.

EXAMPLES

Preparation of Mannich Base Polyamines

Example 1

265 g (1 mole/3 equivalents DMA) of ANCAMINE K-54 (2,4,6-tris (dimethylaminomethyl)-phenol) and 513 g (3 mol amine) of IPDA (5-amino-1,3,3-trimethyl cyclohexane methane amine) were mixed together and heated to a maximum temperature of 155° C. Starting at 130° C., DMA (dimethylamine), the lower boiling amine, formed and was collected in a scrubber containing a mixture of water and acetic acid. The above reaction was carried out over 5 hours. 90 g (2 mol) of DMA were collected. The recovered product was semi-solid and had an amine value of 545 mg KOH/g.

Example 2

265 g (1 mol/3 eqs DMA) of ANCAMINE K-54 and 690 g (3 mol) of JEFFAMINE D-230 (poly(oxy(methyl-1,2-ethanediyl)), alpha-(2-aminomethylethyl)omega-(2-aminomethylethoxy) (available from Huntsman Corp.) were mixed together and heated to a maximum temperature 157° C. The reaction was carried out over 5 hours. The temperature was increased stepwise to control the evolution of the DMA. The DMA was collected in a scrubber containing a mixture of water and acetic acid. 97.2 g (2.16 mol) of DMA were collected. The recovered product had an amine value of 433 mg KOH/g and a viscosity of 2.1 Poise (0.21 Pa-s) at 25° C.

Examples 3–9

The same process as in Examples 1 and 2 was used with all the following amines. The relevant parameters are listed in Table 1 below.

TABLE 1

| | Example # | | | | | | |
|---|---|---|---|---|---|---|---|
| | 3 | 4 | 5 | 6 | 7 | 8 | 9 |
| Amine used | H6OTD | DAPDPG | ANCAMINE 1922A | JEFFAMINE XTJ511 | 1,2-DACH | NAEP | DETA |
| Quantity K-54; g | 345 | 265 | 295 | 265 | 301.2 | 265 | 530 |
| Quantity amine; g; | 500 | 248 | 734.7 | 660 | 388.8 | 387 | 735 |
| Max temperature; ° C. | 154 | 179 | 174 | 174 | 152.6 | 156 | 150.5 |
| DMA recovered; g | 131 | 43 | 135.4 | 105 | 125.6 | 120 | 240 |
| Viscosity at 25° C.; cps | 2900 | 770 | 1230 | 502 | | | 3500 |
| Viscosity at 40° C.; cps | | | | | 8030 | 105400 | |
| AHEW | 61 | 100 | 84.4 | 86 | 55.1 | 87 | 36 |
| Amine Equivalent, mol | 183 | 300 | 253.2 | 258 | 165.3 | 174 | 144 |
| Amine value; mg KOH/g | 667 | 395 | 432.7 | 412 | 690 | 984 | 1118 |

Explanations:
ANCAMINE K-54 is 2,4,6,tris-((dimethylamine)methyl)-phenol (available from Air Products and Chemicals Inc., Allentown PA);
H6OTD is a hydrogenated o-toluenediamine;
JEFFAMINE D230 is poly(oxy(methyl-1,2-ethanediyl)), alpha-(2-aminomethylethyl)omega-(2-aminomethylethoxy)-(polyoxypropylenediamine);
DAPDPG is diaminopropyl dipropyleneglycol;
ANCAMINE 1922A is 1-propanamine,3,3'-(oxybis(2,1-ethanediyloxy))bis- (available from Air Products and Chemicals Inc.);
JEFFAMINE XTJ 511 is poly(oxy(methyl-1,2-ethanediyl)),alpha,alpha'-(oxydi-2,1-ethanediyl)bis(omega-(aminomethylethoxy)) (available from Huntsman Corp.);
1,2-DACH is 1,2-diaminocyclohexane;
DETA is diethylenetriamine; and
NAEP is N-aminoethylpiperazine.

Preparation of Polyepoxide Resins

Example 10

Resin 1

In a reactor filted with a stirrer, a thermocouple and a refluxing condenser, 379 g of polyethylene glycol 1000 (0.758 equivalent OH) and 490 g of a bisphenol A diglycidyl ether having an epoxy equivalent weight of 190 (2.58 equivalent epoxy) were charged. The ratio OH equivalent to epoxy equivalent was 1 to 3.4. Then, 3 g of the BF$_3$-amine catalyst Anchor 1040 were added. The temperature was increased while the products were being homogenized. Next, the temperature was brought to 170° C. The reaction was kept at this temperature until the epoxy equivalent weight was increased to 475–500 from about 250. The product was then cooled down. The resin had the following analytical values:

| | |
|---|---|
| Epoxy Equivalent Weight | 498 |
| Viscosity at 40° C. | 33 Poise (3.3 Pa-s) |

Example 11

Resin 2

In a 2-liter reactor fitted with a stirrer, a thermocouple, and a refluxing condenser, 1100 g JEFFAMINE XTJ-506 (available from Huntsman Corp.) were charged with 550 g n-butanol. The mix was heated up to 65° C. and was properly homogenized. The mix was then discharged.

725 g EPIKOTE 828 (available from Resolution) were charged in a 3-liter reactor fitted with a stirrer, a thermocouple, a refluxing condenser and a dropping funnel containing 1500 g of the previously prepared JEFFAMINE mix. The epoxy resin was heated up to 85° C., and the JEFFAMINE solution was added slowly over 1 hour at 85° C. The batch was stirred further for 4 hours at 85° C. The resulting product had the following analytical values:

| | |
|---|---|
| Epoxy Equivalent Weight | 755 (theoretical EEW is 768) |
| Viscosity at 25° C. | 4.1 Poise (0.41 Pa-s) |
| % Solids | 77 |

At this stage, the solvent was removed.

Adduction Stage (Direct Process)

Example 12

Adduct A 50 g of the product described in Example 1 were charged and heated up to 80° C. 41 g of product prepared as in Example 11 were added in 120 minutes. The addition was slightly exothermic and a maximum pot temperature of 92° C. was noted. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 313 mg KOH/g |
| Viscosity at 25° C. | 1400 Poise (140 Pa-s) |
| n-butanol | 10.3% |
| AHEW | 140.4 |

Example 13

Adduct B 60 g of the product described in Example 2 were charged and heated up to 80° C. 24.4 g of product prepared as in Example 10 were added in about 90 minutes. The addition gave a slight exotherm. The temperature rose to a maximum of 90° C. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 303.5 mg KOH/g |
| Viscosity at 25° C. | 93.6 Poise (9.36 Pa-s) |
| % Solids | 100% |
| AHEW | 138 |

The product was water soluble down to 20% and below.

Example 14

Adduct C 50 g of the product described in Example 3 were charged and heated up to 80° C. 33.0 g of the product prepared as in Example 10 were added in 60 minutes. During the addition, an exotherm could be observed which gave rise to an increase in the, temperature up to a maximum of 98° C. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 400 mg KOH/g |
| Viscosity | Product was solid |
| % Solids | 100% |
| AHEW | 102.5 |

The product was not very soluble in water; it gave an opaque dilution even at 20% solids.

Example 15

Adduct D 60 g of the product described in Example 4 were charged and heated to 80° C. 22.9 g of the product prepared as in Example 10 were added in about 90 minutes. The reaction was exothermic, and a maximum temperature of 91° C. was recorded. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 285 mg KOH/g |
| Viscosity at 40° C. | 448 Poise (44.8 Pa-s) |
| % Solids | 100% |
| AHEW | 145 |

The product was water soluble down to 20% and below.

Example 16

Adduct E 80.3 g of the product described in Example 5 were charged and heated to 80° C. 34 g of the product prepared as in Example 10 were added in about 40 minutes. The reaction was exothermic, and a maximum temperature of 100° C. was recorded. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 308 mg KOH/g |
| Viscosity at 40° C. | 343.7 Poise (3.43 Pa-s) |
| % Solids | 100% |
| AHEW | 177.2 |

The product was water soluble down to 20% and below.

Example 17

Adduct F 60 g of the product described in Example 6 were charged and heated up to 80° C. 22.0 g of product prepared as in Example 10 were added in about 40 minutes. The reaction was exothermic, and a maximum temperature of 100° C. was recorded. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 313.5 mg KOH/g |
| Viscosity at 40° C. | 48.1 Poise (4.81 Pa-s) |
| % Solids | 100% |
| AHEW | 134.6 |

The product was water soluble down to 20% and below.

Example 18

Adduct G 50 g of the product described in Example 7 were charged and heated up to 80° C. 55.7 g of the product prepared as in Example 11 were added in 120 minutes. The reaction was exothermic, and a maximum temperature of 89.8° C. was recorded. At the end of the addition, the temperature was increased to 100° C. and kept for 1 hour. The post reaction was carried out to ensure that all the epoxy had reacted. The product was then cooled down and discharged.

The results of the analysis were:

| | |
|---|---|
| Amine Value | 319 mg KOH/g |
| Viscosity at 25° C. | 231 Poise (2.31 Pa-s) |
| % Solids | 100% |
| AHEW | 120 |

The product was water soluble down to 20% and below.

Example 19

Adduct H1

50 g of the product described in Example 8 were charged and heated up to 80° C. 32.2 g of product prepared as in Example 10 were weighed, and addition was started. By the time 25.8 g of the 32.2 g have been added, the product polymerized and has to be discarded. The addition was done during 90 minutes for the totality of the product. An exotherm was noticed with a maximum temperature of 93.9° C.

Adduction Stage (Solvent Based Process)

The following process has been used when the direct adduction process as shown in Examples 12–18 did not work. The solvent based process takes longer, but the adduction can be carried out. The solvent is used to facilitate the adduction reaction, when the direct route is not feasible, and leads to polymerization.

Example 20

Adduct H2

250 g of product as described in Example 8 were charged and mixed with 300 g n-butanol. Products were heated up to 80° C. 161.2 g of product prepared as in Example 10 were added in 120 minutes. Most of the exotherm was used to keep the temperature at 80° C. At the end of the addition, the temperature was increased to 100° C. and kept for 1 hour. The post reaction was carried out to ensure that all the epoxy had reacted. The pressure was then reduced to 400 mm Hg, and about 100 g of n-butanol were removed. The temperature fell down to 70° C. Afterwards, water was added slowly to remove the remaining n-butanol as an azeotrope. A total of 680 g water was added to remove the remaining 200 g of n-butanol. 282 g of water were used to flush the solvent and were removed with it. This was done under reduced pressure to keep the temperature low, thus having a better safety margin against a possible polymerization. When only water was coming out, the pressure was brought back to normal, and the % solids was adjusted to 50% by addition of 9.6 g of water. Product was discharged.

The results of the analysis were:

| | |
|---|---|
| Amine Value | 196 mg KOH/g |
| Viscosity at 25° C. | 118 Poise (11.8 Pa-s) |
| % Solids | 50% |
| AHEW | 324 |

The product was water soluble down to 20% and below.

Example 21

Adduct K 339 g of the product described in Example 9 were charged and mixed with 300 g n-butanol. Products were heated up to 80° C. 300.9 g of the product prepared as in Example 10 were added in 120 minutes. Most of the exotherm was used to keep the temperature at 80° C. At the end of the addition, the temperature was increased to 100° C. and kept for 1 hour. The post reaction was carried out to ensure that all the epoxy had reacted. The pressure was then reduced to 400 mm Hg, and about 100 g of n-butanol were removed. The temperature fell down to 90° C. Afterwards water was added slowly to remove the remaining n-butanol as an azeotrope. A total of 900 g water was added to remove the remaining 200 g of n-butanol. 512.9 g of water were used to flush the solvent and were removed with it. This was done under reduced pressure of 160–180 mm Hg to keep the temperature low, thus having a better safety margin against a possible polymerization. When only water was coming out, the pressure was brought back to normal, and the % solids was adjusted to 50% by addition of 352 g of water (taking into account a small amount of water lost, 22.4 g, and some water remaining in n-butanol, 26.7g). The product was discharged.

The results of the analysis were:

| | |
|---|---|
| Amine Value | 319 mg KOH/g |
| Viscosity at 25° C. | 60 Poise (6.0 Pa-s) |
| % Solids | 50% |
| AHEW | 135 |

The product was water soluble down to 20% and below.

Example 22

Adducts L and M

Adducts L and M are comparative examples of existing products. L is a polyamine adduct curing agent for waterborne epoxy system, e.g., EPILINK 660 (available from Air Products and Chemicals Inc.) M is a polyaminoamide adduct curing agent for waterborne epoxy system, e.g., EPILINK 360 (available from Air Products and Chemicals Inc.).

Example 23

Concrete Stability

A resin and a curing agent were mixed as indicated in Table 2 below. The mix was diluted to 10% solids (if possible). 1 g of cement (Portland) was added to 50 g of the dilution. The purpose of this Example was to find the conditions at which the emulsion remains stable and does not curdle.

The resulting products were tested in clear thin films applied at 6 mils wet. Results were gathered in Table 3.

The pot life was determined at 20° C. and 65% relative humidity. Glass plates were coated at regular intervals of time using a 10 mils square applicator. The end of the pot-life was taken when it was no longer possible to apply a continuous film.

The Persoz Hardness was measured on films applied on glass plates. The film thickness was about 7 mils wet. This test method is described in ISO 1522. The Persoz Hardness was measured after 24 hours, 3 days, and 7 days.

The gloss was measured at an angle of 20° using the portable Gardner gloss meter. Results were the average of 10 measurements. Measurements were carried out with the plate laid on a black cardboard. The gloss was measured after 24 hours, 3 days, and 7 days. This was done to assess the stability of the gloss over time.

ER-8 is a mixture of bisphenol-A/F diglycidyl ethers (60/40) with about 20% p-t-butylphenylglycidylether.

MANNICH BASED ADDUCTS

TABLE 2

| | Adduct A | Adduct B | Adduct C | Adduct D | Adduct E | Adduct F | Adduct G | Adduct H | Adduct K | Comparative Example L | Comparative Example M |
|---|---|---|---|---|---|---|---|---|---|---|---|
| Amine/resin | IPDA/ Resin 2 | D230/ Resin 1 | D6OTD/ Resin 1 | DAPDGP/ Resin 2 | 1922A/ Resin 1 | KTJ511/ Resin 1 | 1,2-DACH/ Resin 2 | NAEP/ Resin 1 | DETA/ Resin 1 | EPILINK 660 | EPILINK 360 |
| % solids | 100 | 100 | 100 | 100 | 50 | 100 | 100 | 50 | 50 | | |
| CA at 50% | 8.5 | 8.4 | 7.0 | 8.7 | 7.7 | 8.3 | 7.7 | 9.2 | 5.2 | 6.1 | 6.9 |
| Pure CA | 4.2 | 4.2 | 3.5 | 4.3 | 3.9 | 4.1 | 3.9 | 4.6 | 2.6 | 4.2 | 3.4 |
| Water added to 50% | 4.2 | 4.2 | 3.5 | 4.3 | 3.9 | 4.1 | 3.9 | 4.6 | 2.6 | 1.8 | 3.4 |
| Resin used | 5.8 | 5.8 | 6.5 | 5.7 | 6.1 | 5.9 | 6.1 | 5.4 | 7.4 | 5.8 | 6.6 |
| Dilution with Water to 10% | 85.8 | 85.8 | 86.5 | 85.7 | 86.1 | 85.9 | 86.1 | 85.4 | 87.4 | 88.2 | 86.6 |
| Total | 100 | 100 | 100 | 100 | 100 | 100 | 100 | 100 | 100 | 100 | 100 |
| Cement test | Stable* | Stable | Stable | Stable | Stable | Stable | Stable | Stable | Stable* | Unstable | Unstable |

*These products seem to develop some instability upon standing on the shelf for a few months

TABLE 3

| | Adduct A | Adduct B | Adduct C | Adduct D | Adduct E | Adduct F | Adduct G | Adduct H | Adduct K |
|---|---|---|---|---|---|---|---|---|---|
| Amine/resin | IPDA/ Resin 2 | D230/ Resin 1 | H6OTD/ Resin 1 | DAPDGP/ Resin 2 | 1922A/ Resin 1 | KTJ511/ Resin 1 | 1,2-DACH/ Resin 2 | NAEP/ Resin 1 | DETA/ Resin 1 |
| ER8 (EEW) | 190 | 190 | 190 | 190 | 190 | 190 | 190 | 190 | 190 |
| AHEW (100%) | 140.44 | 138.42 | 102.53 | 144.92 | 120 | 134 | 119.7 | 162 | 67.63 |
| AHEW (50%) | 280.88 | 276.84 | 205.06 | 289.84 | 240 | 268 | 239.44 | 324 | 135.26 |
| Extra water to 40% | 355.22 | 354.21 | 336.27 | 357.46 | 345.00 | 352.00 | 344.86 | 366.00 | 318.82 |
| Total | 826.10 | 821.05 | 731.33 | 837.30 | 775.00 | 810.00 | 774.30 | 880.00 | 644.08 |
| CA at 50% | 34.0 | 33.7 | 28.0 | 34.6 | 31.0 | 33.1 | 30.9 | 36.8 | 21.0 |
| Pure CA | 17.0 | 16.9 | 14.0 | 17.3 | 15.5 | 16.5 | 15.5 | 18.4 | 10.5 |
| Water added to 50% | 17.0 | 16.9 | 14.0 | 17.3 | 15.5 | 16.5 | 15.5 | 18.5 | 10.5 |
| Resin used | 23.0 | 23.1 | 26.0 | 22.7 | 24.5 | 23.5 | 24.5 | 21.6 | 29.5 |
| Dilution Water | 43.0 | 43.1 | 46.0 | 42.7 | 15.0 | 15.0 | 44.5 | 41.6 | 49.5 |
| Total | 100.0 | 100.0 | 100.0 | 100.0 | 70.5 | 71.5 | 100.0 | 136.9 | 89.5 |
| Pot-life at 20° C. | 60 min | 90 min | 120 min | <30 min | <30 min | | 210 min | <30 min | 30 min |
| Persoz Hardness development after 1 day | | | | | | | | | |
| 10 minutes | 321 | 239 | 317 | 189 | 143 | 148 | 173 | 285 | 57 |
| 30 minutes | 305 | 280 | 316 | | 169 | | 175 | 300 | 71 |
| 60 minutes | 331 | 276 | 327 | | | 179.3 | 232 | 309 | 81 |
| 90 minutes | | | 340 | | | end pot life | 254 | | |
| 150 minutes | | | | | | | 321 | | |
| 180 minutes | | | | | | | 240 | | |
| 210 minutes | | | | | | | 254 | | |
| Persoz Hardness development after 3 days | | | | | | | | | |
| 10 minutes | 371 | 335 | 370 | 312 | 225 | 332 | 234 | 332 | 92 |
| 30 minutes | 365 | 381 | 371 | | 255 | | 260 | 331 | 100 |
| 60 minutes | 383 | 376 | 372 | | | | 322 | 329 | 84 |
| 90 minutes | | | 360 | | | | 324 | | |
| 150 minutes | | | | | | | 371 | | |
| 180 minutes | | | | | | | 325 | | |
| 210 minutes | | | | | | | 332 | | |
| Persoz Hardness development after 7 days | | | | | | | | | |
| 10 minutes | 387 | 375 | 393 | 345 | 281 | 375 | 309 | 356 | 101 |
| 30 minutes | 392 | 389 | 379 | | 295 | | 327 | 250 | 114 |
| 60 minutes | 384 | 385 | 382 | | | 377 | 350 | 337 | 92 |
| 90 minutes | | | 396 | | | | 360 | | |
| 150 minutes | | | | | | | 392 | | |
| 180 minutes | | | | | | | 360 | | |
| 210 minutes | | | | | | | 353 | | |
| Gloss at 20° after 1 day | | | | | | | | | |
| 10 minutes | 170 | 153 | 173 | | matte | 177.6–0.4 | 104 | | 1.5–0.1 |
| 30 minutes | 156 | 168 | 170 | | matte | | 95 | | 1.2–0.1 |
| 60 minutes | 143 | 164 | 171 | | | 114.6–0.8 | 134 | | 1.8–0.2 |
| 90 minutes | | | 144 | | | | 132 | | |

TABLE 3-continued

| | Adduct A | Adduct B | Adduct C | Adduct D | Adduct E | Adduct F | Adduct G | Adduct H | Adduct K |
|---|---|---|---|---|---|---|---|---|---|
| 150 minutes | | | | | | | 86 | | |
| 180 minutes | | | | | | | 104 | | |
| 210 minutes | | | | | | | 74 | | |
| | | | | Gloss at 20° after 3 days | | | | | |
| 10 minutes | 171 | 148 | 173 | | matte | 178.9–0.4 | 39 | | 1.2–0.1 |
| 30 minutes | 142 | 171 | 171 | | matte | | 77 | | 1.3–0.1 |
| 60 minutes | 140 | 165 | 172 | | | 72.8–0.8 | 81 | | 1.7–0.4 |
| 90 minutes | | | 146 | | | | 86 | | |
| 150 minutes | | | | | | | 88 | | |
| 180 minutes | | | | | | | 107 | | |
| 210 minutes | | | | | | | 88 | | |
| | | | | Gloss at 20° after 7 days | | | | | |
| 10 minutes | 170 | 139 | 172 | | matte | 179.5–6 | 80 | | 1.2–0.1 |
| 30 minutes | 157 | 169 | 170 | | matte | | 73 | | 1.2–0.1 |
| 60 minutes | 146 | 165 | 169 | | | 97.3–0.6 | 121 | | 1.8–0.2 |
| 90 minutes | | | 165 | | | | 120 | | |
| 150 minutes | | | | | | | 86 | | |
| 180 minutes | | | | | | | 105 | | |
| 210 minutes | | | | | | | 72 | | |
| Amount of particles | dense | none | none, after 30 mins, small particles | | none | very few | none | | dense |
| Particle size | fine | none | none from 10–30 minutes after dense | none | | fine | none | | fine |
| Appearance | clear | from 10–30 minutes slightly hazy, afterwards hazy | clear and glossy | | matte | opaque | from 10–30 minutes slightly hazy, afterwards hazy | | opaque |

Example 24

Green Concrete Application

Concrete slabs were poured into forms with bottom plastic liner. Slabs were finished by a steel trowel (Table 4), a broom finish (Table 5), or a mild shot blast after three days (Table 5). Slabs were cured for 24 hours before the forms were removed, the sides of the slab were sealed with a 100% solid marine epoxy, and a second coat was applied 24 hours later. This was done to minimize the moisture lost from the side of the slab. The epoxy formulation as specified in Tables 4 and 5 was applied. The bond strength to concrete slab was determined at regular intervals.

In the first series of tests, a steel trowel finish was used. The concrete had a water/cement ratio of 0.45.

The concrete used had the following formulation:

| | |
|---|---|
| Cement | 470 lbs (213 kg) |
| Fly ash | 100 lbs (45.4 kg) |
| Fine Aggregate | 1420 lbs (645.5 kg) |
| Coarse Aggregate | 1850 lbs (840.9 kg) |
| Water | 30.8 gal (0.116 m³) |
| Admixture | 17.1 oz (0.48 kg) |

In this first test series, the primer was applied on the concrete after 24 hours. 24 hours later, an epoxy topcoat (100% solids) was brushed on half of the primed area. Bond pull tests were performed in triplicate after 24 hours, 7 days, 30 days, and 90 days. Bond pull-off testing was done in accordance with Canadian Standards Association A23.2-6B, "Method of Test to Determine Adhesion by Tensile Load."

Pull tests could not be performed after 12 hours, as the system was still soft and could not be cored. Dollies were glued with a special fast drying epoxy glue. As a comparative example, a solvent free system based on Ancamide 2489 (a low viscosity, fast aliphatic curing agent) was used. The results are shown in the Table 4 below.

TABLE 4

| System Composition | Cure Condition | Primer Only | Primer & Topcoat | Pull Strength psi | S.D. on three samples |
|---|---|---|---|---|---|
| Adduct E | 12 hours | X | | | |
| | 24 hours | X | | 372 | 83 |
| | 7 days | X | | 462 | 39 |
| | 30 days | X | | 564 | 150 |
| | 90 days | X | | 357 | 130 |
| | 12 hours | | X | 490 | 9 |
| | 24 hours | | X | 497 | 34 |
| | 7 days | | X | 294 | 36 |
| | 30 days | | X | 252 | 56 |
| | 90 days | | x | 422 | 48 |
| Adduct F | 12 hours | X | | | |
| | 24 hours | X | | 256 | 37 |
| | 7 days | X | | 172 | 69 |
| | 30 days | X | | 57 | 0 |
| | 90 days | X | | 186 | 95 |
| | 12 hours | | X | 294 | 21 |
| | 24 hours | | X | 234 | 22 |
| | 7 days | | X | 208 | 46 |
| | 30 days | | X | 101 | 17 |
| | 90 days | | X | 208 | 42 |

The results from Table 4 showed clearly that such systems presented advantages particularly in view of the results obtained with the application of a topcoat 24 hours after the primer had been brushed. The topcoat used was a 100% gray epoxy system based on a cycloaliphatic curing agent (ANCAMINE 1618 available from Air Products and Chemicals Inc.). The topcoat is usually applied at least 4 weeks after the concrete slabs have been laid to insure a good adhesion to the concrete.

The comparative examples containing ANCAMINE 2489 did not wet the substrate properly, and intense crawling was observed. On the contrary, the compositions containing adducts E and F displayed a homogeneous surface.

In the second series of tests, slabs were finished with both a broom finish which was coated after 24 hours and a mild shot blast finish which was coated after the blasting had been finished. Both finishes were tested 24 hours after the application of the primer. The concrete used had a water/cement ratio of 0.60.

The concrete used had the following formulation:

| | |
|---|---|
| Cement | 470 lbs (213 kg) |
| Fine Aggregate | 1450 lbs (658 kg) |
| Coarse Aggregate | 1900 lbs (862 kg) |
| Water | 34 gal (0.128.7 m³) |

The purpose of the second test series was to demonstrate the influence of the concrete finishing on the behavior and properties of the product in Adduct E. One finish was done with a hard broom and the other was a mild shot blasting, which is used to remove the efflorescence from the surface and give a better and closer finish. A broad disparity seemed to exist in the results from the first series. Consequently, the inventor added two more dollies per determination for a more reliable result. The results are presented in Table 5 below.

TABLE 5

| System Composition | Cure Condition | Broom | Shot blast | Bond Strength psi | S.D. on five samples |
|---|---|---|---|---|---|
| Comparative Example (no Primer) | 7 days | X | | 155 | 39 |
| | 28 days | X | | 109 | 27 |
| | 90 days | X | | 78 | 24 |
| | 7 days | | x | 140 | 12 |
| | 28 days | | x | 278 | 34 |
| | 90 days | | x | 240 | |
| Adduct E/ EPIRES ER8 | 7 days | X | | 348 | 63 |
| | 28 days | | x | 405 | 101 |
| | 90 days | | x | 312 | 74 |
| | 7 days | | x | 286 | 61 |
| | 28 days | | x | 385 | 69 |
| | 90 days | | x | 366 | 45 |

The results demonstrate that the composition of the present invention would improve the bond strength of the primed concrete. Surprisingly, the improvement took place at an early stage. Also, unexpected was the influence of the shot blasting treatment which almost doubled the value of the control.

While the invention has been described in detail and with reference to specific examples thereof, it will be apparent to one skilled in the art that various changes and modifications can be made therein without departing from the spirit and scope thereof.

We claim:

1. A water-soluble composition comprising a water soluble polyamine adduct which is a reaction product of:

(a) an alkoxy group modified polyepoxide resin containing an average of at least 1.5 epoxide groups per molecule; and
    (b) a Mannich base polyamine, wherein the Mannich base polyamine is a reaction product of a polyamine containing at least two amino groups with a N-Mannich condensate prepared from a reaction of a phenolic compound, an aldehyde, and a secondary amine; and provided that the secondary amine of the N-Mannich condensate is replaced by one of the at least two amino groups of the polyamine, the polyamine boils at a higher temperature than the secondary amine, and at least one of the at least two amino groups of the polyamine is a primary or a secondary amino group; and wherein the ratio of the Mannich base polyamine to the alkoxy group modified polyepoxide resin contains an excess of an active amine hydrogen relative to epoxide groups so that the water soluble polyamine adduct has an amine hydrogen equivalent weight (AHEW) of at most 1000 based on solids content.

2. The water-soluble composition of claim 1, wherein the alkoxy group modified polyepoxide resin is a member selected from the group consisting of (i) a reaction product of a polyether polyol containing at least 2 OH groups and a polyalkoxy chain with a polyepoxide resin containing an average of at least 1.5 epoxide groups per molecule;
    (ii) a reaction product of a polyepoxide resin containing an average of at least 1.5 epoxide groups per molecule with a polyalkoxy monoamine containing a polyalkoxy chain, wherein the polyalkoxy monoamine has the following structure:

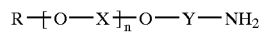

where R is H or $C_1$ to $C_{12}$ alkyl, X is a $C_2H_4$, $C_3H_6$, or $C_4H_8$ alkyl group, Y is a $C_2H_4$, $C_3H_6$, or $C_4H_8$ alkyl group, and n is a number of repeats sufficient to produce the polyalkoxy monoamine having a molecular weight of from about 200 to about 4000;

(iii) a polyglycidyl ether of a polyether polyol containing at least 2 OH groups and a polyalkoxy chain; and
    (iv) a diglycidyl ether derivative of an alkoxylated diphenol containing an average of at least 1.5 epoxide groups per molecule.

3. The water-soluble composition of claim 2, wherein the polyether polyol in (i) has a molecular weight from about 200 to about 4000.

4. The water-soluble composition of claim 3, wherein the molecular weight of the polyether polyol in (i) is from 800 to 1200.

5. The water-soluble composition of claim 2, wherein the polyalkoxy chain of the polyether polyol in (i) is a member selected from the group consisting of polyethylene oxide, polypropylene oxide, polybutylene oxide, and polytetrahydrofuran.

6. The water-soluble composition of claim 5, wherein the alkoxy group of the polyether polyol in (i) is polyethylene oxide or polypropylene oxide.

7. The water-soluble composition of claim 2, wherein the polyepoxide resin in (i) is at least one of bisphenol-A epoxy resin and bisphenol-F epoxy resin.

8. The water-soluble composition of claim 2, wherein a molar ratio of the polyether polyol to the polyepoxide resin in (i) is from about 1/1.5 to about 1/10.

9. The water-soluble composition of claim 8, wherein the molar ratio of the polyether polyol to the polyepoxide resin in (i) is from 1/2 to 1/4.

10. The water-soluble composition of claim 2, wherein the polyalkoxy monoamine in (ii) has a molecular weight from about 800 to about 1200.

11. The water-soluble composition of claim 2, wherein the polyalkoxy chain of the polyalkoxy monoamine in (ii) is a member selected from the group consisting of polyethylene oxide, polypropylene oxide, polybutylene oxide, and polytetrahydrofuran.

12. The water-soluble composition of claim 11, wherein the polyalkoxy chain of the polyalkoxy monoamine in (ii) is polyethylene oxide or polypropylene oxide.

13. The water-soluble composition of claim 2, wherein the polyalkoxy chain of the polyether polyol in (iii) is a member selected from the group consisting of polyethylene oxide, polypropylene oxide, polybutylene oxide, and polytetrahydrofuran.

14. The water-soluble composition of claim 2, wherein the polyglycidyl ether of the polyether polyol in (iii) has a molecular weight from about 200 to about 4000.

15. The water-soluble composition of claim 14, wherein the polyglycidyl ether of the polyether polyol in (iii) has a molecular weight from 800 to 1200.

16. The water-soluble composition of claim 2, wherein the alkoxylated diphenol in (iv) has a structure:

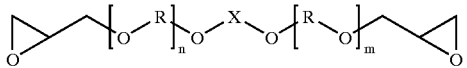

where X is an arylidene radical derived from a diphenol, R is a $C_2H_4$, $C_3H_6$ or $C_4H_8$ alkyl group, and n+m=1 to 20.

17. The water-soluble composition of claim 16, wherein n+m=4 to 10.

18. The water-soluble composition of claim 2, wherein the diphenol is resorcinol, bisphenol-A, or bisphenol-F.

19. The water-soluble composition of claim 1, wherein the alkoxy group modified polyepoxide resin is reacted with the Mannich base polyamine at an epoxy equivalent/amine equivalent ratio of about 1/3 to about 1/12.

20. The water-soluble composition of claim 19, wherein the epoxy equivalent/amine equivalent ratio is from about 1/4 to about 1/6.

21. The water-soluble composition of claim 1, wherein the secondary amine a member selected from the group consisting of dimethylamine, diethylamine, dipropylamine, and dibutylamine.

22. The water-soluble composition of claim 1, wherein the polyamine further comprises an alkoxylate group.

23. The water-soluble composition of claim 1, wherein the polyamine is a member selected from the group consisting of an aliphatic polyamine, an arylaliphatic polyamine, a cycloaliphatic polyamine, an aromatic polyamine, a heterocyclic polyamine, and a polyalkoxypolyamine.

24. The water-soluble composition of claim 23, wherein the polyamine is a member selected from the group consisting of diethylenetriamine, triethylenetetramine, 1,3-bisaminocyclohexylamine, isophorone diamine, N-aminoethylpiperazine, 4,7-dioxadecane-1,10-diamine, 1-propanamine,3,3'-(oxybis(2,1-ethanediyloxy))bis-, poly (oxy(methyl-1,2-ethanediyl)), alpha-(2-aminomethylethyl) omega-(2-aminomethylethoxy), triethyleneglycoldiamine, and poly(oxy(methyl-1,2-ethanediyl))alpha,alpha'-(oxy(di-2,1-ethanediyl)) bis(omega-(aminomethylethoxy)).

25. The water-soluble composition of claim 1, wherein the N-Mannich condensate and the polyamine are reacted at an active site/mole ratio of about 0.8 to about 2.

26. The water-soluble composition of claim 25, wherein the active site/mole ratio is about 0.8 to about 1.2.

27. The water-soluble composition of claim 1, wherein the N-Mannich condensate has at least two active sites.

28. The water-soluble composition of claim 27, wherein the N-Mannich condensate is 2,4,6-tris-(dimethylaminomethyl)phenol.

29. The water-soluble composition of claim 1, wherein the water soluble polyamine adduct is diluted with water to form a polyamine adduct solution.

30. The water-soluble composition of claim 1, wherein consisting essentially of the water soluble polyamine adduct.

31. The water-soluble composition of claim 1, wherein the AHEW is at most 350 based on solids content.

32. The water-soluble composition of claim 1, wherein the AHEW is at most 200 based on solids content.

33. The water-soluble composition of claim 1, wherein the water-soluble polyamine adduct is diluted with water to at least 20 wt % to form a single phase at a temperature of 20° C., provided that water is essentially free of an organic co-solvent.

34. The water-soluble composition of claim 33, wherein the water-soluble polyamine adduct is diluted with water to at least 10 wt %.

35. A process for preparing a water-soluble composition of claim 1 comprising:
(a) producing a N-Mannich condensate by reading a phenolic compound, an aldehyde, and a secondary amine;
(b) producing a Mannich base polyamine, wherein the Mannich base polyamine is a reaction product of a polyamine containing at least two amino groups with a N-Mannich condensate prepared from a reaction of a phenolic compound, an aldehyde, and a secondary amine; and provided that the secondary amine of the N-Mannich condensate is replaced by one of the at least two amino groups of the polyamine, the polyamine boils at a higher temperature than the secondary amine, and at least one of the at least two amino groups of the polyamine is a primary or a secondary amino group; and
(c) reading the Mannich base polyamine with an alkoxy group modified polyepoxide resin containing an average of at least 1.5 epoxide groups per molecule, wherein the ratio of the Mannich base polyamine to the alkoxy group modified polyepoxide resin contains an excess of an active amine hydrogen relative to epoxide groups so that the water soluble polyamine adduct has an amine hydrogen equivalent weight (AHEW) of at most 1000 based on solids content.

36. The process of claim 35, further comprising diluting the water-soluble composition with water.

37. The process of claim 35, further comprising diluting the Mannich base polyamine with an organic solvent to form an azeotropic mixture with water, azeotropically removing the organic solvent, and adding water in an amount sufficient to adjust a polyamine adduct solution to from about 10 to about 90 wt % solids.

38. The process of claim 35, water is added in an amount sufficient to adjust the polyamine adduct solution to 50–80 wt % solids.

39. A composition comprising a product of reaction of a water-soluble composition of claim 1 and a polyepoxide resin containing an average of at least 1.5 epoxide groups per molecule, wherein the composition is capable of hardening.

40. The composition of claim 39, wherein the polyepoxide resin reacted with the water-soluble composition is at least one of bisphenol-A epoxy resin and bisphenol-F epoxy resin.

41. The composition of claim 39 adapted to be used as a primer, a coating, a curing compound, and/or a sealant for concrete.

42. The composition of claim 39 adapted to be applied to wet concrete to provide a cured concrete, wherein the composition remains attached to the cured concrete and functions as both a curing compound and a primer.

43. A process of treating a concrete, comprising:
   curing the concrete using a curing compound to provide a cured concrete wherein the concrete has set; and/or
   priming the concrete using a primer to provide a primed concrete, wherein at least one of the curing compound or the primer comprises the composition of claim 39.

44. The process of claim 43, wherein the curing compound and the primer comprise the composition of claim 39 provided that the curing compound remains attached to the cured concrete and functions as both the curing compound and the primer.

45. The process of claim 43, wherein the water-soluble composition is formed by reacting:
   (a) a Mannich base polyamine, wherein the Mannich base polyamine is a polyetherpolyamine; and
   (b) an alkoxy group modified polyepoxide resin containing an average of at least 1.5 epoxide groups per molecule, wherein the alkoxy group modified polyepoxide resin is a member selected from the group consisting of:
      i) a reaction product of a polyether polyol containing at least 2 OH groups and a polyalkoxy chain and a polyepoxide resin containing an average of at least 1.5 epoxide groups per molecule; and
      ii) a reaction product of a polyepoxide resin containing an average of at least 1.5 epoxide groups per molecule with a polyalkoxy monoamine containing a polyalkoxy chain, wherein the polyalkoxy monoamine has the following structure:

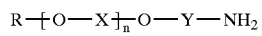

where R is H or $C_1$ to $C_{12}$ alkyl, X is a $C_2H_4$, $C_3H_6$, or $C_4H_8$ alkyl group, Y is a $C_2H_4$, $C_3H_6$, or $C_4H_8$ alkyl group, and n is a number of repeats sufficient to produce the polyalkoxy monoamine having a molecular weight of from about 200 to about 4000.

46. A primer for concrete comprising a product of reaction of a polyepoxide resin containing an average of at least 1.5 epoxide groups per molecule and a water-soluble composition, wherein the water-soluble composition is formed by:

(a) reacting a phenolic compound, an aldehyde and secondary amine to form a N-Mannich condensate;
(b) forming a Mannich base polyamine, wherein the Mannich base polyamine is a reaction product of a polyamine containing at least two amino groups with a N-Mannich condensate prepared from a reaction of a phenolic compound, an aldehyde, and a secondary amine; and provided that the secondary amine of the N-Mannich condensate is replaced by one of the at least two amino groups of the polyamine, the polyamine boils at a higher temperature than the secondary amine, and at least one of the at least two amino groups of the polyamine is a primary or a secondary amino group; and
(c) reacting the Mannich base polyamine with an alkoxy group modified polyepoxide resin containing an average of at least 1.5 epoxide groups per molecule to form the polyamine adduct, wherein the primer is adapted to be applied on concrete that has set.

47. The primer for concrete of claim 46, wherein the Mannich base polyamine is a polyetherpolyamine and the alkoxy group modified polyepoxide resin containing an average of at least 1.5 epoxide groups per molecule is a member selected from the group consisting of:
   i) a reaction product of a polyether polyol containing at least 2 OH groups and a polyalkoxy chain and a polyepoxide resin containing an average of at least 1.5 epoxide groups per molecule; and
   ii) a reaction product of a polyepoxide resin containing an average of at least 1.5 epoxide groups per molecule with a polyalkoxy monoamine containing a polyalkoxy chain, wherein the polyalkoxy monoamine has the following structure:

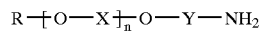

where R is H or $C_1$ to $C_{12}$ alkyl, X is a $C_2H_4$, $C_3H_6$, or $C_4H_8$ alkyl group, Y is a $C_2H_4$, $C_3H_6$, or $C_4H_8$ alkyl group, and n is a number of repeats sufficient to produce the polyalkoxy monoamine having a molecular weight of from about 200 to about 4000.

48. The primer for concrete of claim 46, wherein the polyepoxide resin reacted with the water-soluble composition is at least one of bisphenol-A epoxy resin and bisphenol-F epoxy resin.

* * * * *